US000001494H

United States Statutory Invention Registration [19]

[11] Reg. Number: H1494

[45] Published: Oct. 3, 1995

Feldman et al.

[54] PHOTOPUMPED X-RAY LASER

[75] Inventors: Uri Feldman, Columbia, Md.; John F. Seely, Lorton, Va.; George A. Doschek, Potomac, Md.

[73] Assignee: The United States of America as represented by the Secretary of the Navy, Washington, D.C.

[21] Appl. No.: 803,272

[22] Filed: Oct. 11, 1985

[51] Int. Cl.[6] ..... H01S 3/02

[52] U.S. Cl. ..... 372/5; 372/70; 359/333; 359/345

OTHER PUBLICATIONS

*Y. Conturie et al.*, Journal of Optical Society of America, vol. 71, pp. 1309–1314, Nov. 1981, No. 11 Publication.

*I. I. Sobel 'Man et al.*, P. N. Lebedev Physical Institute Academy of Sciences of the USSR, Moscow, USSR, Advances in Atomic and Molecular Physics, vol. 20, pp. 327–345 Publication.

*J. F. Seely et al.*, E. O. Hulbert Center for Space Research, NRL, Washington, D.C., 20375, vol. 54, No. 10, 11 Mar. 85, pp. 1016–1019 Publication.

Publication–P. L. Hagelstein, Univ of CA, Lawrence Livermore National Laboratory, Livermore, Calif. 94550, Plasma Physics vol. 25, No. 12, pp. 1345–1367 1983.

*Primary Examiner*—Bernarr E. Gregory

*Attorney, Agent, or Firm*—Robert F. Beers; William T. Ellis

[57] ABSTRACT

An X-ray laser for producing an intense collimated beam of X-rays, comprising a Ca lasant material in the shape of a rod with an axis and having an appropriate aspect ratio to facilitate amplified spontaneous emission to thereby generate a collimated beam of X-rays along the axis, in combination with an X-ray pumping material of high density Xe gas disposed in adjacency with the Ca rods, and a radiation-absorption material of Ar gas. Means for ionizing the Ca to Ca XX ions, the Xe to Xe XLV ions and the Ar to Ar XVII ions is provided. The Ca XX ions lase on the n=3 to n=2 lasing transition. The Ar ionic gas acts to absorb the second transition radiation from the lower n=2 to n=1 laser transition of the Ca XX ions to thereby prevent self-quenching of the lasing transition. The device generates an X-ray beam at approximately 16.3 angstroms along the axis of the Ca lasant material.

10 Claims, 2 Drawing Sheets

The relative ion abundances in a low-density plasma.

The pumping transition (solid curves) and the absorbing transition (dashed curve).

PHOTOPUMPED X-RAY LASER

BACKGROUND OF THE INVENTION

The present invention is directed generally to the field of lasers, and more particularly to the field of X-ray lasers for producing intense, collimated beams of X-rays.

The generation of X-ray beams is highly desirable for use in scientific research and in space-based weapons applications. With specific regard to space-based weapons, the short wavelength X-ray beams could be used to focus high energy photons of many joules onto a small spot on a satellite or an incoming warhead. These high energy X-ray photons are capable of penetrating and vaporizing the target material much more readily than other photons.

Resonance photoexcitation is a desired technique for achieving a population inversion and high gain on an X-ray transition. Resonance photoexcitation is obtained when the pumping transition photon energy is nearly the same as the lasant material absorbing transition. A very bright X-ray source, such as a nuclear explosion, can be used to create a highly-ionized pumping plasma with strong X-ray line emission. This strong X-ray line emission can be used to resonantly excite a transition in a given gain medium to obtain X-ray lasing.

A basic problem confronting the art is to obtain good wavelength coincidence between two suitable X-ray transitions. A second problem confronting the art is to avoid self-quenching of the X-ray lasing transition.

OBJECTS OF THE INVENTION

Accordingly, it is an object of the present invention to produce intense, collimated beams of X-rays at wavelengths on the order of 100 angstroms or less.

It is a further object of the present invention to prevent self-quenching in an X-ray laser device.

Other objects, advantages, and novel features of the present invention will become apparent from the detailed description of the invention, which follows the summary.

SUMMARY OF THE INVENTION

Briefly, the present invention is an X-ray laser for producing an intense beam of X-rays comprising a lasant material formed along an axis to have an appropriate aspect ratio to facilitate amplified spontaneous emission to thereby generate a collimated beam of X-rays along the axis. The lasant material is adapted for being ionized to form ions from the group consisting of hydrogen-like (H I) and helium-like (He I) ions. The lasant material ions have a lasing X-ray transition from a third energy level down to a lower second energy level for generating desired X-ray radiation, and a second transition from the second energy level to a lower first energy level for generating second transition radiation. The device further includes an X-ray pumping material adapted for being ionized to form neon-like (Ne I) ions for generating X-ray pumping radiation resonant with the lasant material ions to create a population inversion between the third energy level and the lower second energy level of the lasant material ions, with this X-ray pumping material being disposed in adjacency with the lasant material. The device further includes a radiation-absorption material for absorbing the second transition radiation to prevent self-quenching of the X-ray transition, and means for ionizing the X-ray pumping material to neon-like ions and for ionizing the lasant material to hydrogen-like or helium-like ions, in order to facilitate the lasing X-ray transition and to generate the X-ray beam along the axis.

In a preferred embodiment, the lasant material is Ca, the pumping material is high density Xe gas, and the radiation absorbing material is Ar gas which is ionized to form Ar XVII ions. Typically, the lasant material will be in the form of a rod with an aspect ratio of at least 10 to 1. In a preferred embodiment, the ionizing means may be a 10 kiloton nuclear bomb disposed in adjacency with the lasant material.

DETAILED DESCRIPTION OF THE PREFERRED EMBODIMENT

Figure 1:
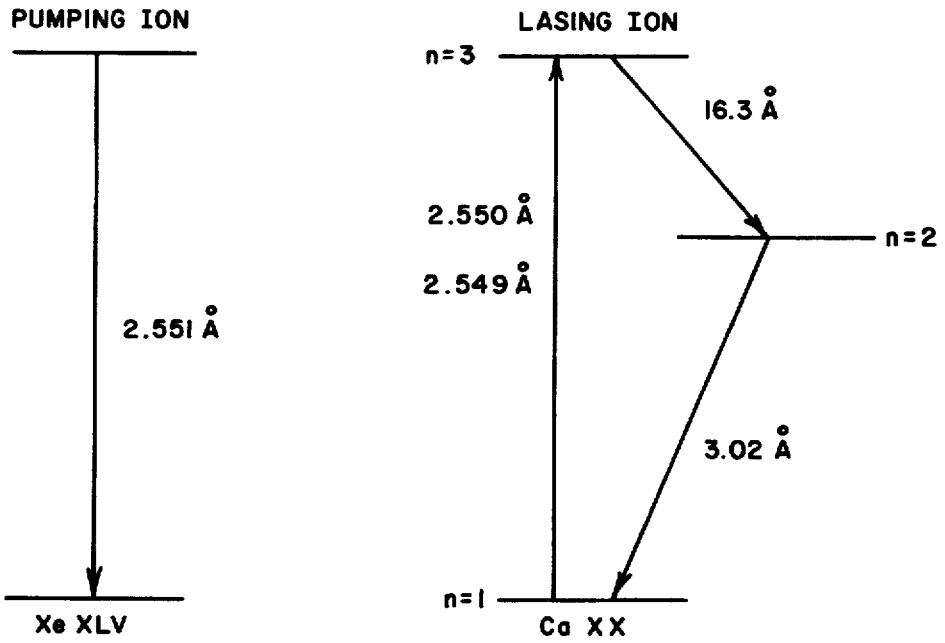
FIG. 1 is a schematic diagram of the pumping and lasing energy transitions that may be utilized to implement the present invention.

The present invention will be described in the context of an Xe pump material and a Ca lasant material resonant combination. It should be understood, however, that a variety of resonant material combinations may also be utilized to implement the present invention. A number of these resonant material combinations are set forth in Table I at the end of this Specification.

There are a number of basic requirements that must be satisfied in order to have a proper resonant material combination. First, the profiles of the pumping and the absorbing transitions for the respective material must substantially overlap. Note that due to the relatively low electron density (typically less than $10^{20}$ $cm^{-3}$) in a given gain medium, Stark broadening is negligible. Thus, in the absence of other broadening mechanisms, the wavelengths of the pumping and the absorbing transition must be within a Doppler width, which is approximately 1 milli-angstrom for the X-ray transitions considered herein. In order to alleviate this profile overlap requirement, the pumping line should typically be opacity-broadened in the source plasma. For a high optical depth, the width of the opacity-broadened profile is 2 or 3 times the Doppler width. It is sufficient if the absorbing line for the lasant material is within 1 or 2 milli-angstroms of the pumping transition.

A second requirement for a proper resonant material combination is that the pumping transition should have a large oscillator strength and should originate in the ground configuration of the ion in order to achieve a high intensity X-ray beam and a large optical depth in the pumping plasma. Additionally, this pumping ion should occur over a large range in temperature and should be abundant in the pumping plasma.

A third requirement for the resonant material combination is that the absorbing transition in the lasant material be strong. In order to insure a large population inversion for the lasant material, the absorbing transition should originate on the ground state of the lasing ion. This is because the ground state typically has the greatest population of electrons which may be excited.

A final condition for obtaining a proper resonant material pair is that the absorbing transition must be excited to a level that radiatively decays to a lower level that has a much higher decay rate. When the lower laser level decays very rapidly, then a quasi-steady state population inversion can occur. If the lower laser level radiatively decays to the ground state of the ion, then reabsorption of this radiation would repopulate the lower laser level and would quench the population inversion. Thus, the transverse dimension of the gain medium must be sufficiently small so that the optical depth of the radiation from the lower laser level is small. Moreover, if a large number of identical gain media are packed into a small volume, then each gain medium must be isolated from the ground-level radiation originating in the nearby gain media.

With respect to a choice of lasant materials, the ions in the H I and He I isoelectronic sequences are attractive absorbing ions. The transitions ls $^2$S-np $^2$p and ls$^2$ $^1$S-lsnp $^1$p where (n =3 or 4) in these sequences are readily excited. Thus, it is possible to achieve quasi-steady state population inversions on the n =3 –2 transitions. However, the reabsorption of the n =2 –1 radiation causes self-quenching.

Figure 3:
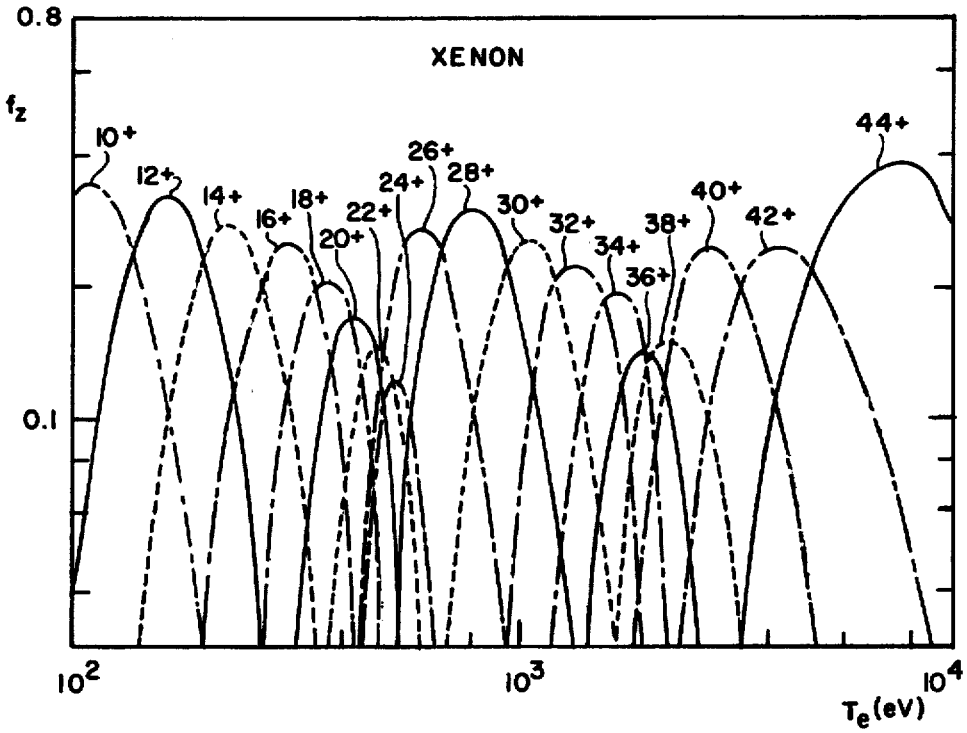
FIG. 3 is a graphical diagram of the relative ion abundances of Xe at various temperatures.

With respect to a choice of pumping materials, the high Z ions in the Ne I isoelectronic sequence are attractive pumping ions. The neon-like ions occur over a wide range of temperatures. FIG. 3 illustrates the abundances of the various ionization stages of Xenon in a low-density plasma. The neon-like Xe ions are indicated by the curve labeled 44+. These Ne I ions radiate strongly on 5 transitions of the type $2p^6$–$2p^5$3d and $2p^6$–$2p^5$3s.

Figure 4:
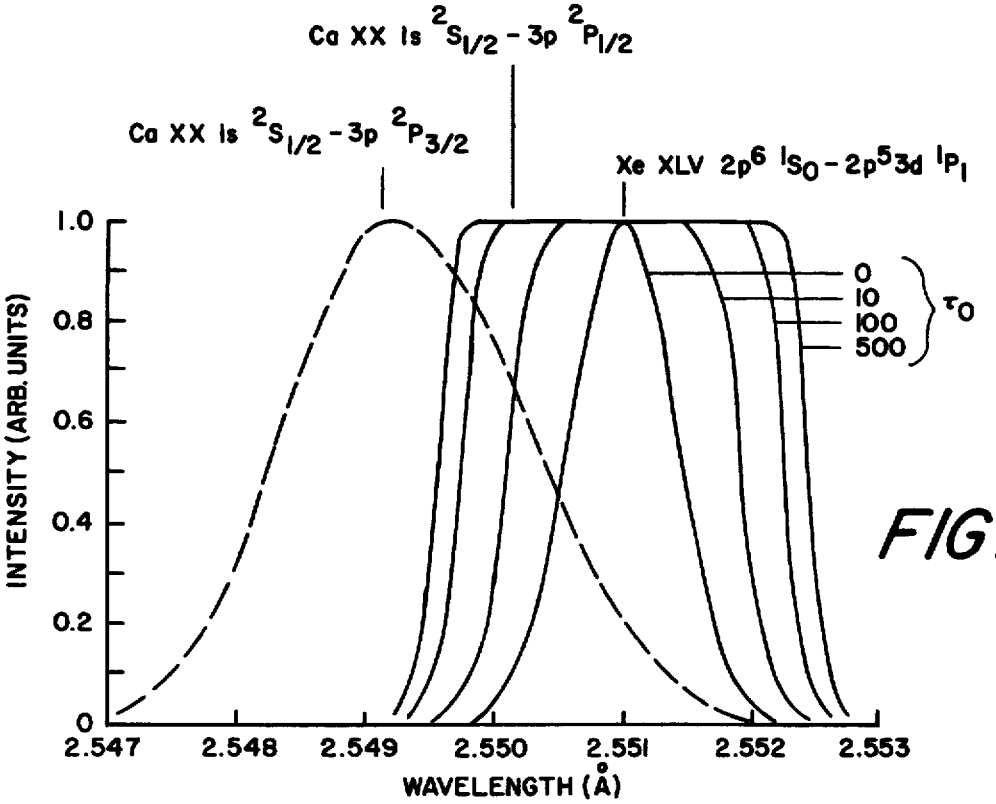
FIG. 4 is a graphical representation of the pumping and absorbing transition intensities vs. wavelength and optical depth.

Referring now to FIG. 1, this figure illustrates the pumping and absorbing transition pair of the preferred embodiment of the present invention. In this figure, the Xe XLV 2.551 angstrom transition is utilized to pump the Ca XX ls $^2S_{1/2}$–3p $^2p_{1/2}$ transition. This notation for the Xe ion means that 44 out of a total of 54 electrons have been removed from the Xe in order to form the Xe ion. Accordingly, the Xe XLV ion has only 10 electrons and is neon-like. Likewise, the Ca atom has 19 out of its 20 original electrons removed. Accordingly, the Ca XX ion has one electron to make it hydrogen-like. Both the Xe XLV ion and Ca XX ion are abundant over the temperature range 5000–10000 eV. This is the temperature range which is realized upon the detonation of a 10 kiloton nuclear bomb. From FIG. 1, it can be seen that the 2,551 angstrom transition of the Xe XLV ion is approximately coincident with the n=1 to n=3 transition of 2.550 angstroms for the Ca XX ion. As noted previously, the profiles of the pumping and absorbing transitions must substantially overlap in order to have a proper resonant material pair. It has been found that if the Xenon plasma is of sufficient density and size, then the Xe XLV 2.551 angstrom line will be optically thick with a peak intensity equal to the blackbody intensity. The width of this laser line depends on the optical depth and can be as large as three times the Doppler width. For a Xenon pressure of 10 atmospheres, the optical depth of the Xe XLV 2.551 angstrom transition in the interior of the plasma is greater than 1000. FIG. 4 illustrates the Xe XLV pumping transition overlap with the Ca XX absorbing transition. It can be seen that the width of the opacity-broadened profile is sufficient to overlap completely the Ca XX transition at 2.551 angstroms. Accordingly, FIG. 4 illustrates that there is a proper resonant pairing between the Xe XLV ion and the Ca XX ion.

For the resonant transition match described above, the Xe XLV 2.551 angstrom transition acts to pump the Ca XX ls $^2S_{1/2}$–3p $^2p_{1/2}$ transition. Ion collisions (collisional mixing) rapidly distribute the 3p population of electrons to all of the Ca XX n=3 sublevels for electron densities greater than $10^{18}$ $cm^{-3}$. This population inversion leads to transitions from the n=3 energy level down to lower energy levels, with the largest gain occurring on the 3d-2p transition at 16.3 angstroms. The electrons on the n= 2 energy level of Ca XX then transition down to the n=1 energy level.

Of primary concern is the tendency for self absorption of the Ca XX 1s-2p transitions at 3.02 angstroms. This process repopulates the lower laser level of n = 2 and acts to quench the population inversion, i.e., eliminates the population inversion between the n =3 and n =2 energy levels of the Ca XX ion. This self-quenching is exacerbated when a plurality of laser rods are disposed in adjacency.

In order to solve the foregoing self-quenching problem, a radiation-absorption material is disposed in adjacency with the lasant material. With the Xe XLV-Ca XX resonant pair of FIG. 1, a radiation-absorption material of Ar XVII ionic plasma is utilized. The Ar XVII ion designates an Argon ion with 16 of its 18 electrons removed to make it a helium-like ion. This Ar XVII ionic plasma operates to absorb the 3.02 angstrom radiation generated by the transition in the Ca XX ion from the n=2 to the n=1 energy levels. This absorption by the Ar XVII ions prevents the 3.02 angstrom radiation from one lasing medium from quenching itself or from spoiling the population inversion in other nearby lasing media.

Figure 2:
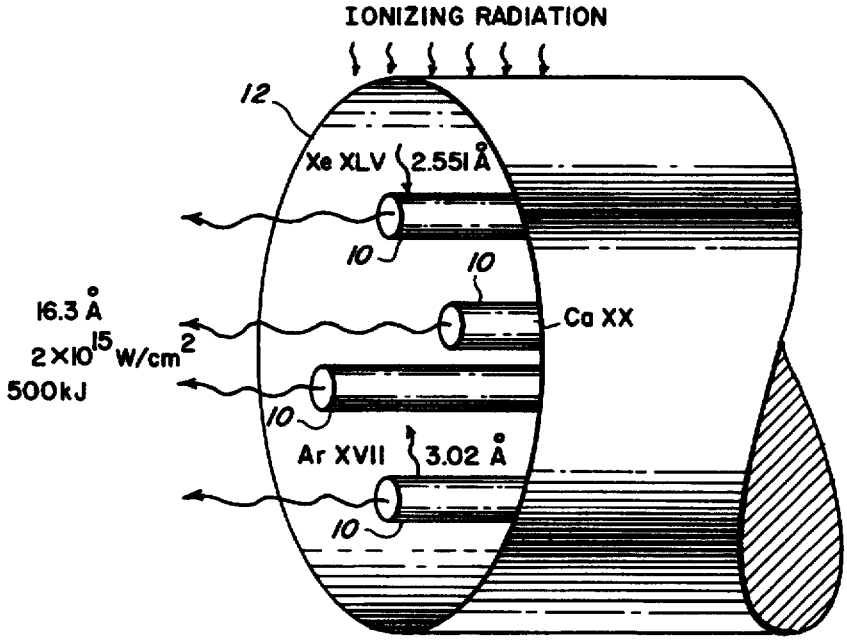
FIG. 2 is a schematic diagram of one embodiment of the present invention.

Referring now to FIG. 2, there is shown a preferred embodiment of the present invention. In this embodiment, a plurality of lasant media 10 are disposed in a cylindrical air-tight casing 12. Typically, this casing 12 will be constructed of steel, glass, or plastic. Each lasant medium 10 is formed along an axis to have an appropriate aspect ratio in order to facilitate amplified spontaneous emission of X-rays. Typically, this aspect ratio for the lasant medium 10 should be on the order of at least 10×1, i.e., the transverse dimension should be smaller by a factor of 10 to the long dimension. This high aspect ratio permits the concentration of the laser energy into a beam. In the embodiment shown in FIG. 2, the lasant medium 10 comprises a plurality of rods of calcium-bearing material with a diameter of 2 mm and with lengths of approximately 1 meter. Typically these rods are formed by embedding calcium in a plastic foam. The specific gravity should be approximately 0.1 for the foam with approximately 1 calcium atom per carbon atom in the foam. It is preferred that the foam have small cells with a uniform density. It should be noted that the calcium lasant media could also simply be a calcium-bearing gas disposed in a cylindrical tube made of glass or plastic.

As noted above, the desired pump material is Xe. Typically, the Xe pump material will be in the form of a gas disposed within the cylindrical casing 12 in adjacency with the lasant media 10. In order to insure that the Xe pumping line is opacity-broadened in order to obtain a substantial overlap with the Ca transition, the Xe gas is at a pressure of approximately 10 atmospheres.

A radiation-absorption material in the form of Ar gas is also disposed in the cylindrical casing 12 at a pressure of approximately 10 atmosphere.

The container 12 is disposed in adjacency to an ionizing means such as a nuclear bomb. Any type of nuclear bomb may be utilized, the only limitation being that the nuclear bomb generate 3 blackbody radiation in the 3 keV-10 keV temperature range in order to generate X-rays. In this temperature range, the blackbody distribution has a peak in the X-ray range. In a preferred embodiment, the nuclear bomb may be a 10 kiloton nuclear bomb.

In operation, the detonation of the nuclear bomb generates temperatures which are so hot that most of the energy emitted is at X-ray wavelengths (essentially 3 keV blackbody radition). These X-ray wavelengths ionize the Xe to 3 keV Xe XLV plasma at a pressure of 10 atmospheres, ionize the Ca to 3 keV Ca XX plasma, and ionize the Ar to Ar XVII plasma. After the nuclear explosion, the casing 12 is ruptured and the Ca rods 10 are vaporized. However, these vaporized Ca rods 10 still have a linear geometry sufficient to define the size and direction of the laser beam. This linear geometry is maintained for approximately 20 nanoseconds. After 20 nanoseconds, the Ca XX plasma begins to expand. After the nuclear explosion and the ionization of the Xe, the Ca, and the Ar, the dense Xe XLV plasma generates 2.551 angstrom radiation with an intensity equivalent to a 3 keV blackbody. This 2.551 angstrom radiation pumps the Ca XX 2.550 angstrom transition in the Ca plasma gain media 10. Single pass lasing occurs on the Ca XX 16.3 angstrom transition with a saturated intensity of $2\times10^{15}$ W/cm$^2$. The energy output from the collimated beam of X-rays generated along the axis of each of the Ca gain media 10 is on the order 500 kJ. The 3.02 angstrom radiation generated from the n=2 lower laser level transition to the n=1 energy level of the Ca XX ions is absorbed by the Ar XVII plasma, thereby preventing this 3.02 angstrom radiation generated from one lasing medium rod 10 from spoiling the population inversions in other nearby lasing media 10. Using a 10 kiloton nuclear explosion to pump 10$^6$ such lasing media described above, the overall efficiency for the conversion of nuclear energy to 16.3 angstrom radiation is approximately 1%.

For the Xe-Ca lasant material pair, the ratio of the upper and lower laser levels in the Ca XX ions is $N_3/N_2$= 10.7. For an electron density of $3\times10^{19}$ cm$^{-3}$ and assuming that one-third of the calcium ions are in the hydrogenic ground state, the population densities at the various energy levels of the calcium ion plasma are as follows:

$N_1$= $5.3\times10^{17}$ cm$^{-3}$;

$N_2$= $1.9\times10^{16}$ cm$^{-3}$; and $N_3$= $2.1\times10^{17}$ cm$^{-3}$. For a 3 keV ion temperature, the Doppler width of the Ca XX n=3–2 transitions at 16.3 angstroms is 10.9 milliangstroms. The calculated gains for the 3d-2p and the 3p-2s transitions in the Ca XX ion are as follows:

For the 3d $^2D_{5/2}$–2p $^2p_{3/2}$, the wavenlength is 16.372 and the gain is 4.7 cm$^{-1}$; for the transition 3d $^2D_{3/2}$–2p $^2p_{1/2}$, the wavelength is 16.229 with a gain of 2.5 cm$^{-1}$; for the transition 3p $^2p_{3/2}$–2S$^2S_{1/2}$, the wavelength is 16.234 with a gain of 1.0 cm$^{-1}$; and for the transition 3p $^2p_{1/2}$–2s $^2S_{1/2}$ the wavelength is 16.281 with a gain of 0.5 cm$^{-1}$.

For a gain length of L=100 cm, the saturation intensity for the 3d $^2D_{5/2}$–2p $^2p_{3/2}$ transition (the highest gain transition) is $2\times10^{15}$W/cm$^2$. The linewidth for this saturated transition is equal to the Doppler width of 10.9 milliangstroms. The intensity of the 3 keV continuum radiation within the linewidth of the laser transition is $2\times10^{13}$W/cm$^2$.

It should be noted that the Argon gas provides a good radiation-absorption material because there are a large number of transitions of the type ls$^2$ $^1S_0$–lsnp $^1p_1$ in Ar XVII plasma which overlap the Ca XX ls-2p transitions. Assuming that the Argon pressure is 10 atmospheres and that one-third of the Argon is in the helium-like ionization stage, then a 2 mm thickness of Argon has an opacity of 2.1. This opacity is sufficient to attenuate the Ca XX 3.02 angstrom radiation. Accordingly, the use of the Argon-absorption material permits the packing of a large number of lasing media into a small volume to thereby increase the overall efficiency of the device.

As noted previously, there are a variety of resonant material combinations which may be utilized in order to obtain X-ray lasing. In a preferred embodiment, the pumping ion will be in the Ne I isoelectronic sequence, which is abundant over a broad range of plasma temperatures which occur during nuclear explosions. The lasant material should be a plasma in either the H I or the He I isoelectronic sequences. The lasing transitions in the H I and the He I sequences are very strong and saturate at a high intensity. These strong lasing transitions result in a high laser output on the order of 500 kJ per beam. Table I provides a list of resonant material combinations whereby pumping and absorbing transitions substantially overlap. Note in particular that using the Eu LIV transition for photopumping the Cr XXIV, the radiation at 2.0956 angstroms from the lower laser level of the Cr ion can be absorbed by a radiation-absorption material of Sc XXI on the transition 1s $^2S_{1/2}$–7p $^2p_{1/2}$. This transition has a wavelength of 2.0976 angstroms.

The present design provides an X-ray laser device capable of producing an intense, collimated beam of X-rays for use in scientific research and in space-based weapons applications. This X-ray laser device is specially designed to prevent self-quenching of the laser to thereby permit the dense packing of lasing media into a small volume. Accordingly, the present X-ray laser device provides a significant increase in the overall efficiency of the laser.

It should be noted that although the ionizing means in this design was implemented via the brute force method of a nuclear bomb, it is anticipated that other methods for developing the Xe, Ar, and Ca ionic plasmas will soon be available.

Obviously many modifications and variations of the present invention are possible in light of the above teachings. It is therefore to be understood that within the scope of the appended claims, the invention may be practiced otherwise than as specifically described.

TABLE 1

(U) Wavelength Coincidences

| | Ne I Transition | λ (Å) | | Coincident Transition | λ (A) | Laser (Å) |
|---|---|---|---|---|---|---|
| As XXIV | 2p$^6$ $^1S_0$ - 2p$^5$3d $^3D_1$ | 8.457 ± 0.005 | Na XI | 1s $^2S_{1/2}$ - 3p $^2P_{1/2}$ | 8.4603 ± 0.0001 | |
| | | | Na XI | 1s $^2S_{1/2}$ - 3p $^2P_{3/2}$ | 8.4591 ± 0.0001 | 54.1 |
| I XLIV | 2p$^6$ $^1S_0$ - 2p$^5$3s $^1P_1$ | 2.859 ± 0.005 | K XVIII | 1s$^2$ $^1S_0$ -1s4p$^1P_1$ | 2.8598 ± 0.0002 | 51.8 |
| Xe XLV | 2p$^6$ $^1S_0$ - 2p$^5$3d $^1P_1$ | 2.551 ± 0.001 | Ca XX | 1s $^2S_{1/2}$ - 3p$^2P_{1/2}$ | 2.5501 ± 0.0001 | |
| | | | Ca XX | 1s $^2S_{1/2}$ - 3p $^2P_{3/2}$ | 2.5490 ± 0.0001 | 16.37 |
| Eu LIV | 2p$^6$ $^1S_0$ - 2p$^5$3d $^1P_1$ | 1.765 ± 0.005 | Cr XXIV | 1s $^2S_{1/2}$ - 3p $^2P_{1/2}$ | 1.7669 ± 0.0001 | |
| | | | Cr XXIV | 1s $^2S_{1/2}$ - 3p $^2P_{3/2}$ | 1.7657 ± 0.0001 | 11.36 |

TABLE 1-continued

| | Ne I Transition | λ (Å) | (U) Wavelength Coincidences Coincident Transition | | λ (A) | Laser (Å) |
|---|---|---|---|---|---|---|
| Tl LXXII | $2p^6\ ^1S_0 - 2p^53d\ ^3P_1$ | 1.123 ± 0.005 | Zn XXX | $1s\ ^2S_{1/2} - 3p\ ^2P_{1/2}$ | 1.1248 ± 0.0001 | |
| | | | Zn XXX | $1s\ ^2S_{1/2} - 3p\ ^2P_{3/2}$ | 1.1259 ± 0.0001 | 7.26 |
| Pb LXXIII | $2p^6\ ^1S_0 - 2p^53d\ ^3P_1$ | 1.094 ± 0.005 | Ga XXX | $1s^2\ ^2S_0 - 1s3p\ ^1P_1$ | 1.0942 ± 0.0002 | 7.06 |
| Th LXXXI | $2p^6\ ^1S_0 - 2p^53s\ ^1P_1$ | .7188 ± 0.005 | Rb XXXVI | $1s^2\ ^1S_0 - 1s3p\ ^1P_1$ | 0.7182 ± 0.0002 | 4.86 |

What is claimed and desired to be secured by Letters Patent of the United States is:

1. An X-ray laser for producing an intense beam of X-rays, comprising:

a lasant material formed along an axis to have an appropriate aspect ratio to facilitate amplified spontaneous emission to thereby generate a collimated beam of X-rays along said axis, said lasant material adapted for being ionized to form ions from the group consisting of hydrogen-like (H I) and helium-like (He I) ions, said lasant material ions having a lasing X-ray transition from a third energy level down to a lower second energy level for generating desired X-ray radiation and a second transition from said second energy level to a lower first energy level for generating second transition radiation;

an X-ray pumping material adapted for being ionized to form neon-like (Ne I) ions for generating opacity-broadened X-ray pumping radiation resonant with said lasant material ions to create a population inversion between said third energy level-and said lower second energy level of said lasant material ions, said X-ray pumping material being disposed in adjacency with said lasant material;

a radiation-absorption material for absorbing said second transition radiation to prevent self-quenching of said X-ray transition; and means for ionizing said X-ray pumping material to neon-like ions and for ionizing said lasant material to hydrogen-like or helium-like ions, in order to facilitate said lasing X-ray transition and to generate said X-ray beam along said axis.

2. An X-ray laser as defined in claim 1, wherein said lasant material is Ca.

3. An X-ray laser as defined in claim 2, wherein said pumping material is a high density of Xe, and wherein said radiation-absorbing material is Ar, and wherein said ionizing means includes means for ionizing Ar to form Ar XVII ions.

4. An X-ray laser as defined in claim 3, wherein said shaped Ca lasant material comprises a plurality of parallel, adjacent Ca rods, and said Xe pumping material and said Ar radiation-absorbing material are Xe and Ar gases, respectively, disposed about said Ca rods.

5. An X-ray laser as defined in claim 4, wherein said ionizing means is a 10 kiloton explosion for generating 3 keV blackbody radiation.

6. An X-ray laser as defined in claim 4, wherein said ionizing means is a nuclear bomb.

7. A method for generating an X-ray beam of radiation comprising the steps of:

choosing a lasant material capable of forming ions from the group consisting of hydrogen-like (H I) and helium-like (He I) ions, said lasant material ions having a lasing X-ray transition from a third energy level down to a lower second energy level for generating a desired X-ray transition, and a second transition from said second energy level to a lower first energy level for generating second transition radiation, said lasant material being shaped along an axis to have an appropriate aspect ratio to facilitate amplified spontaneous emission to thereby generate an X-ray beam along said axis;

choosing an X-ray pumping material adapted for being ionized to form neon-like (Ne I) ions for generating X-ray radiation resonant with said lasant material ions to thereby create a population inversion between said third energy level and said lower second energy level of said lasant material ions, and disposing said X-ray pumping material in adjacency with said lasant material in a concentration to facilitate opacity broadening;

ionizing said X-ray pumping material to form neon-like ions and simultaneously ionizing said lasant material to form hydrogen-like or helium-like ions;

generating and directing X-ray radiation on said X-ray transition along said axis; and absorbing said second transition radiation to prevent self-quenching of said X-ray transition.

8. A method as defined in claim 7, wherein said lasant material choosing step comprises choosing a lasant material of Ca.

9. A method as defined in claim 8, wherein said pumping material choosing step comprises the step of choosing a pumping material of high density Xe gas; and wherein said absorbing step comprises the step of disposing Ar gas in adjacency with said Ca lasant material.

10. An X-ray laser for producing an intense beam of X-rays, comprising:

a Ca lasant material in the shape of a rod with an axis and having an appropriate aspect ratio to facilitate amplified spontaneous emission to thereby generate a collimated beam of X-rays along said axis, said Ca adaptable to be ionized to Ca XX ions for lasing on a n=3 to n =2 lasing transition, and having a second transition from n=2 to n=1 which generates second transition radiation;

an X-ray pumping material of high density Xe gas disposed around said shaped Ca rod and adapted for being ionized to form Xe XLV ions for generating opacity-broadened X-rays at approximately 2.551 angstroms to resonantly pump and thereby create a population inversion between said n =3 and n =2 energy levels in said Ca ions;

a radiation-absorption material of Ar gas adaptable for being ionized to form Ar XVII ions for absorbing said second transition radiation to prevent self-quenching of said lasing transition; and means for ionizing said Ca to Ca XX ions, said Xe to Xe XLV ions, and said Ar to Ar XVII ions, to thereby generate an X-ray beam at approximtely 16.3 angstroms along said axis.

* * * * *